United States Patent [19]

Harlan et al.

[11] 3,744,407
[45] July 10, 1973

[54] UNIVERSAL SINGLE SIDE SKINNING MACHINE

[75] Inventors: Martin L. Harlan; Paul V. Kalavitz, both of Grand Rapids, Mich.

[73] Assignee: Wolverine World Wide, Inc., Rockford, Mich.

[22] Filed: Aug. 26, 1971

[21] Appl. No.: 175,268

[52] U.S. Cl............................... 99/589, 83/4, 83/72
[51] Int. Cl............................................ A22c 17/12
[58] Field of Search...................... 146/130; 99/589; 83/4

[56] References Cited
UNITED STATES PATENTS

| | | | |
|---|---|---|---|
| 2,681,675 | 6/1954 | Burch | 146/130 |
| 1,777,375 | 10/1930 | Merrick | 146/130 |
| 3,559,707 | 2/1971 | Townsend | 146/130 |
| 3,424,217 | 1/1969 | Burch | 146/130 X |

*Primary Examiner*—Willie G. Abercrombie
*Attorney*—Price, Heneveld, Huizenga & Cooper

[57] ABSTRACT

A universally positionable skinning machine for separating the skin and residual meat of single hog sides. The skinning machine is uniquely adapted for placement on either side of a conveyor on which the hog sides are transported along a processing line. The apparatus includes a cam-controlled, adjustable, double-acting, fluid-cylinder control apparatus to position the skinning blade in a first, raised, non-cutting position, or a second cutting position, and in the event of excessive pressure against the blade, to allow the blade to move temporarily away from the skin for relief of the excess pressure. The apparatus further includes a unique gripping jaw having a specially configured locking lip arrangement to hold a minimal edge of the hog side while at the same time preventing it from pulling out of the clamp during skinning operations.

8 Claims, 4 Drawing Figures

PATENTED JUL 10 1973 3,744,407

UNIVERSAL SINGLE SIDE SKINNING MACHINE

BACKGROUND OF THE INVENTION

This invention relates to skinning of animal sides and more particularly, to an apparatus for skinning a single hog side to separate the skin from the attached meat and fatty tissue. This invention relates to improvements in skinning machines of the type disclosed, for example, in commonly assigned U.S. Pat. Nos. 2,649,881 issued Aug. 25, 1953 to D. L. Runnells, Jr., et al; 2,681,675 issued June 22, 1954 to P. F. Burch; 2,989,105 issued June 20, 1961 to P. F. Burch; and 3,249,139 issued May 3, 1966 to D. L. Runnells, Jr., et al.

The growth in recent years of a consumer recognition of and a demand for high quality, tough, comfortable footwear and other clothing articles made of treated pigskin has required the manufacturer such as the assignee herein to purchase considerably more skins from sources such as packing houses. Since packing houses must usually incorporate a skinning machine directly into the heart of their high-speed packing line, the skinning machine must be completely reliable. Also, since bacon, one of the most valuable products of hogs, is a substantial share of the material removed from the skin during the skinning operation, the machine should not waste any of the bacon product. If a skinning machine cannot meet both of these stringent requirements, it is not acceptable to the packing house owners from whence the skins are obtained. In efforts to meet these conditions, if the skin is damaged in the removal of the bacon and "fatback" as by skin puncture, cutting, or gouging, the skin is not useful to the footwear manufacturer. Consequently, the skinning operation must be performed very exactly to meet these requirements.

The hog skins used by the leather goods manufacturer with this apparatus are "half" skins obtained from skinning so-called "single hog sides." These are created by the butchering method of splitting the hog through the belly and through the backbone. The single hog side, made up of the skin and the layer of meat and fat remaining after removal of the rib cage and loins, is gripped along the "fatback" edge at the backbone region and pulled around a drum past a closely spaced skinning blade. To maintain the speed of the packing house production line, the skinning machine must be capable of exactly skinning a large number of sides per unit of time.

A substantial number of packing houses have converted to processing "double hogsides," i.e., obtained by splitting the hog along the belly but not through the back, and processing on a skinning machine particularly designed for double hogside processing. Some packing houses because of their size, the expense involved, or perhaps even their unwillingness to change, are unwilling to convert to double hogside processing and yet want to supply hog sides to the manufacturer while at the same time maximizing bacon output and maintaining their production speed and efficiency.

One way to achieve these objects would involve placing two of the skinning machines on opposite sides of the production line. This would be accomplished by so placing a pair of machines such as disclosed in any of the above-mentioned patents, for example, U. S. Pat. No. 2,649,881. Unfortunately, because of the location of the drive mechanisms and the pneumatic controls for the skinning machine, one of the machines will be positioned closer to the line than the other as the drive mechanisms extend approximately two feet from the side of the machine. This, of course, causes wasted operator motion and the resultant loss of production efficiency on that machine. Further, it would be too expensive.

The present invention, therefore, has for one of its important objects the provision of a "universal" skinning machine wherein the drive mechanisms and controls are generally positioned internally of the apparatus, thereby allowing it to be positioned on either side of the production line with equal facility.

During skinning operations, the meat is clamped in a notch or ditch which extends longitudinally along the periphery of the rotatable cylinder. A pneumatically actuated, longitudinally extending clamping bar is movable within the ditch to clamp the edge of the hog side between a pair of jaws at the "fatback" area where the hog is split along the backbone. To avoid the waste of meat products thereon and to obtain the maximum amount of resultant useable skin, it is desirable to grasp the hog side with a minimum "bite." To take a small bite, using the conventional clamp mechanism, too often results in slippage of the hog side out of the clamp part way around the drum as the skinning blade is forced through the hog side.

It is therefore another important object of the present invention to provide a skinning machine having a clamping means which provides a relatively narrow and effective bite to grasp the hog side along the "fatback" area.

Another important object of the invention resides in special control of the skinning blade. As is known, the blade is positioned radially adjacent the cylinder periphery, extending axially thereof, so that as the hog side is rotated with the cylinder, with the skin side adjacent the cylinder, the knife is moved downwardly toward the skin to cut the meat away. Control of the depth of the cut is extremely important. If too much meat remains on the side, valuable meat products are wasted. Conversely, if the cut gouges into the skin, the skin is useless to the footwear manufacturer, and tough skin and rind will be left on the meat product requiring expensive manual skinning and trimming operations. The present machine uses unique blade position control means to achieve optimum cutting with relief from excess pressure.

These and other important objects and features of the invention will become apparent upon studying the following specification in conjunction with the drawings in which.

The machine of the present invention includes many of the elements of the machines of the above-identified patents. As will be obvious to those skilled in the art, some of the elements have been omitted to more clearly illustrate the present invention.

Figure 1:
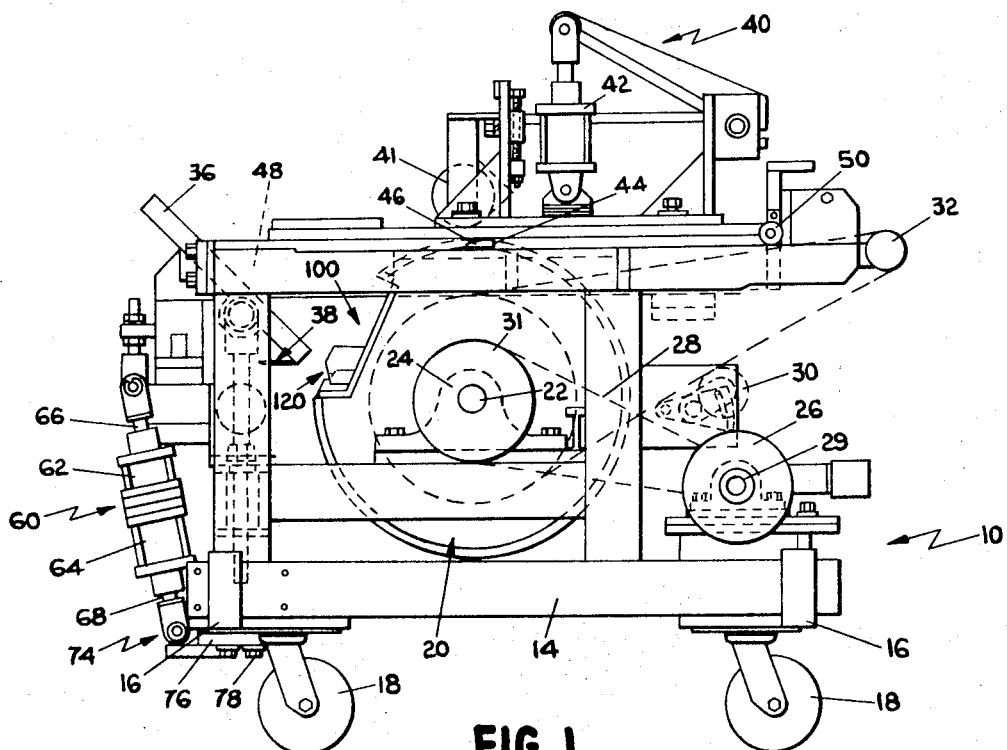
FIG. 1 is a side-elevational view of the machine.
Figure 2:
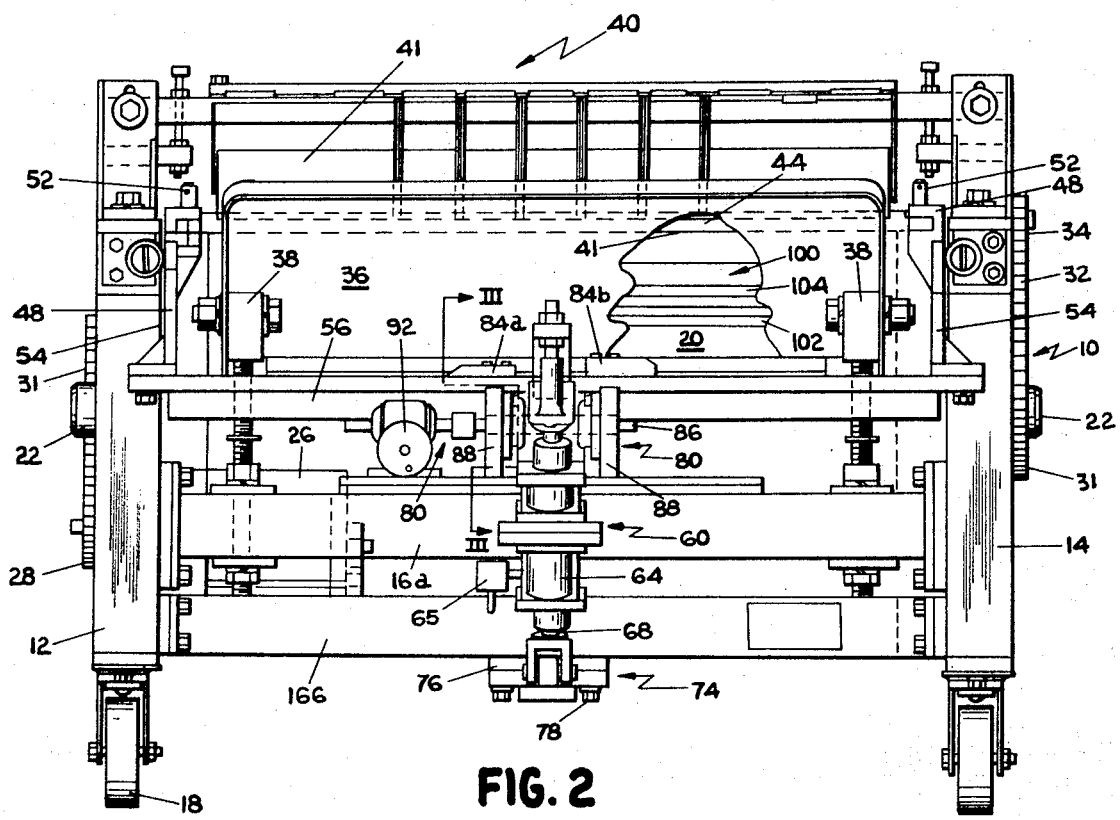
FIG. 2 is a front-elevational view of the machine.

Turning now to the drawings and in particular to FIGS. 1 and 2, the invention includes a main-supporting structure 10 having side frames 12 and 14 connected together by a plurality of suitable cross members 16. The entire supporting frame is conveniently mounted on caster wheels 18.

A skinning drum 20 having an axle 22 extending from each of its ends is mounted within the framework on the side frame by means of pillow block bearings 24 in conventional manner.

A drive motor 26 mounted within framework 10 is operatively connected to drum 20 by means of chain-drive members 28 passing over suitable sprocket members 29 and 31. A drive tensioner 30 may be provided to maintain proper tension on the chaindrive means. A second drive chain 32 supplies the motive force to an outfeed conveyor (not shown) driven by a sprocket 34 at the outlet end of the machine.

A feed table or apron 36 is provided at the inlet end of the apparatus to feed the hog sides to drum 20 in proper orientation. The feed table extends transversely between side frames 12 and 14 and is pivotally and adjustably supported at its ends by an adjustment means 38. A pressure-roller assembly 40 having pressure wheels 41 is supported above drum 20. The roller assembly is conventionally operated in relationship with drum 20 by means of an actuator 42.

Positioned between drum 20 and pressure-wheels 41 is a rigid, transversely extending blade 44 having a cutting edge 46 facing the front or inlet end of the machine. The knife 44 is supported at its ends by rails 48 adjacent the sides of the framework 12 and 14. The rails are pivoted to the frame at the outlet end of the apparatus on pivot pins 50 (FIG. 1). The blade may be fixed to the rails by means of pins, screws, or like fastening means 52 (FIG. 2).

At the inlet end of the apparatus, the rails are each provided with a downwardly extending extension or leg 54 extending a slight distance downwardly toward and parallel to the approximate center line of the drum 20. The rails 15 are held in a spaced-apart position at the inlet end by a transversely extending cross bar 56 which is connected at its ends to the lower ends of legs 54. The blade is therefor seen to be movable upwardly and downwardly, toward and away from the drum by movement of the rails at the cross bar 56, causing the rails to pivot about pivot pins 50. A pair of rollers 58 positioned on side frame members 12 and 14 provide a bearing surface for the downwardly extending legs 54 and prevent transverse movement of the blade and arms.

The structure thus far described, is in general, the structure described in greater detail in the above-identified prior patents with the exception of the drive mechanisms. As described above, the drive motor 26 as illustrated in FIGS. 1 and 2 is positioned within the framework 10. The chain driving means 28 and 32 connected to the stripper drum 20 and to the sprocket 34 of the outfeed conveyor mechanism respectively are positioned on either side of the framework 10 adjacent the siderails 14. The drive chains then need only extend a very slight distance from the side of the framework. Chain guards (not shown) may be placed over the drive chains for reasons of safety. The placement of the drive means within the frame allows the placement of the skinning machine closely adjacent either side of a production line conveyor.

Figure 3:
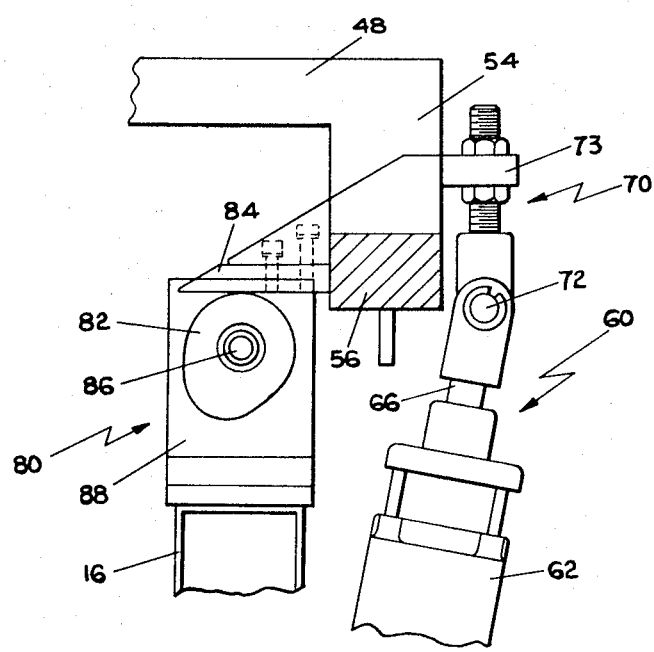
FIG. 3 is a cross-sectional view of a portion of the machine taken along the plane III—III of FIG. 2.

As is well known to those skilled in the art, it is desirable to position the blade in a first, raised, non-skinning position at the beginning of the stripping operation, and then, simultaneously with rotation of the drum for beginning the stripping operation, to lower the knife toward the drum and skin so that it is spaced from the drum an amount which is approximately the thickness of the layer of skin. Upon the occurrence of an obstruction in the path of the blade during the skinning operation, provision must be made for quickly releasing the pressure on the blade and allowing it to move away from the drum. Referring now additionally to FIG. 3, the novel control mechanism 60 for accomplishing the above will be described in greater detail.

The blade-position control mechanism 60 is centrally located at the front of the apparatus generally below the apron 36. The mechanism 60 basically comprises a pair of air cylinders 62 and 64 connected to each other in a back-to-back, i.e., "piggy back" relationship. Each of the cylinders has an extendable piston rod, 66 and 68 respectively, extending from its outer end, so that the rods extend from the opposite ends of the double unit. The piston rod 66 of upper cylinder 62 is operatively connected to the cross bar 54. This cross bar spaces blade-holding and pivotable rails 48 by means of a clevis 70 and pin 72 or the like to an adjustment bracket 73 which is fixed to the cross rail 56 in a convenient manner such as, for example, by welding. The piston rod 68 extending from lower cylinder 64 is similarly fixed to one of the cross bars 16 of frame 10 by means of a clevis and pin 74. This clevis is suitably secured to a bracket 76 fixed to the framework cross bar 16 as by bolts and nuts 78. Each of the air cylinders 62 and 64 is of conventional construction, having fluid-pressure ports at either end of the internal cylinder to control the position of the extendable rod.

Prior to the skinning operation, upper cylinder 62 has fluid pressure supplied thereto to cause piston rod 66 to extend, thereby lifting the blade 44 away from the drum. As the skinning operation commences and the drum 20 begins to rotate, fluid pressure is supplied to the opposite port of cylinder 62, causing piston rod 66 to retract within the cylinder, thereby drawing the blade toward the drum.

Downward travel of rails 48 and blade 44 is limited and controlled by an adjustment mechanism 80 which includes a cam 82 adapted for engagement with an outwardly extending projection or cam follower 84 located on the upper adjustment bracket 73. The cam is mounted on a shaft 86 which in turn is rotatably mounted between a pair of brackets 88 fixed on the cross brace 16a in a convenient manner. A gear reduction unit and right angle drive assembly 90 (FIG. 2) are operatively connected to shift 86. By means of conveniently located hand wheel 92, the cam may be rotated, thereby providing an adjustment to control the limit of downward travel of the blade 44.

Normally, blade 44 is positioned in a horizontal orientation parallel to the center line of the drum. Some processors, however, prefer to tip the blade slightly either one degree up or one degree down with respect to the drum. Provision is therefore made for conveniently making this change by providing replacement cam-follower inserts 84a and 84b which may be conveniently inserted in the cam-follower adjustment bracket 73. To prevent their loss or damage, the replacement inserts are conveniently fixed to the cross bar member 56 in the vicinity of the control mechanism 60.

The lower cylinder 64 with its extendable piston rod 68 acts as a pneumatic spring and allows the blade to move upwardly away from the drum upon the occurrence of an obstruction or other jamming action of the apparatus during skinning operations. During normal operation, pressure is applied to the rod end port of the lower cylinder 64 through a conventional quick-relieving device 65 such as a regulator or other pressure relieving valve, causing the rod to retract. The opposite port of cylinder 64 is vented to the atmosphere. When pressure builds up against the blade 44 (in a direction away from the drum 20) in excess of the pressure to which the regulator is pre-set, the air in the cylinder bleeds off through the quick-relieving regulator 65, thereby allowing the blade to momentarily move upwardly almost instantaneously. When the blade has passed the obstructed area, the pressure returns to normal and the blade returns under bias to its original position as rod 68 is retracted.

Figure 4:
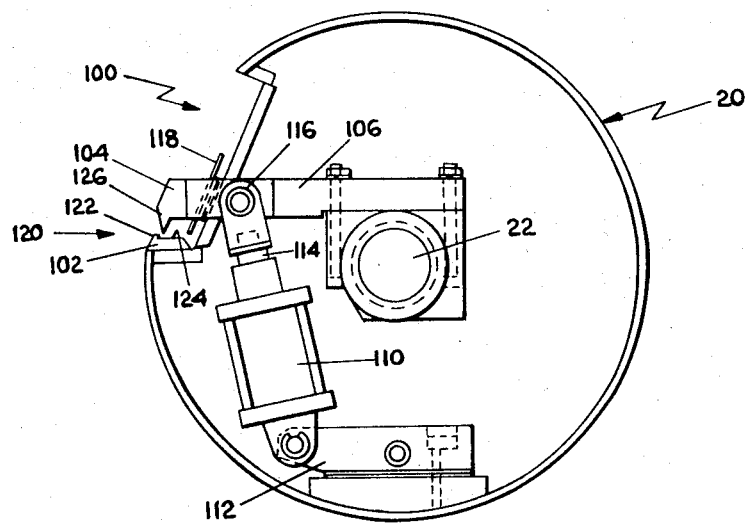
FIG. 4 is a side view of the rotating drum and clamping mechanism utilized in the machine.

Referring now to FIG. 4, the gripping clamp of the invention will be described in detail. The drum 20 is provided with a longitudinally extending notch or ditch 100 therein which includes a fixed jaw member 102 extending along and fixed to the trailing edge of the ditch. A rigid, movable clamping bar or jaw 104 extends along the ditch and has its ends secured to one end of a pair of arms 106 (one side of the drum only is illustrated, the opposite side is identical). The opposite ends of arm 106 are pivoted on a bearing 18 about the axle of drum 20. The clamp bar or movable jaw 104 is activated by a pair of air cylinders 110 pivotally mounted on mounting block 112 on drum 20. The rods 114 of the cylinders are each pivotally connected through a clevis and pin 116 to an arm 106. Retraction of the piston rod 114 by the application of pressure to the cylinder 110 will cause jaw 104 to move toward the fixed jaw 102. Extension of the piston rod will move the movable jaw 104 nearer the opposite side of ditch 100. An adjustable abutment means 118 is provided at the back face of the ditch and is used to control the relative spacing between the back of the ditch and the clamping surface between the jaws 102 and 104. This, of course, may be adjusted to either increase or decrease the depth of the bite on the hog sides to be processed. When holding the hog sides at the "fatback" edge portion, a "brute-force" type clamping action is generally unsatisfactory because the meat at that portion of the hog side is tough and the clamp cannot "dig in" and firmly grip the hog side. Some of the prior art patents attempt to overcome this difficulty by providing, in addition to the clamping members, a plurality of pin members which penetrate through the meat and skin to hold the hog side in place on the drum.

The novel jaw assembly 120 of the present invention having a fixed jaw 102 and a movable jaw 104, as contrasted to the prior art structures, is relatively simple, and works extremely well. The fixed jaw is provided with an upstanding projection 122 extending a slight distance above the face 124 of the fixed jaw and extending completely along its length. The movable jaw has a sharpened edge portion 126 which also extends along its length. When the jaws are moved forward a closed position as illustrated in FIG. 4, a slight spacing exists between the sharpened edge 126 of the movable jaw and the face 124 of the fixed jaw. Prior to closing of the clamp, the edge of the "fatback" portion of the hog side is positioned between the jaws 102 and 104 against the abutment means 118, with the skin side against the face 124 of the fixed jaw 122. Fluid pressure is then applied to cylinders 110 causing the piston rods to retract, thereby moving the jaw 104 toward the fixed jaw. As the jaws are closed, the sharpened edge 126 cuts into the meat on the "fatback" portion, but stops short of the skin, and wedges the hog side between the sharpened portion 126 and the upstanding projection 122. After skinning operations are completed in the conventional manner, a narrow strip of meat equal to the distance between the sharpened edge portion 126 and the abutment means 118 remains on the skin which has been removed. By adjustment of the abutment means 118, the amount of meat remaining on the skin can be held to a minimum. Since the skin is not penetrated by pins, or cut, or otherwise damaged by the clamping means, greater yields of skin can be provided.

Many of the constructional details of the apparatus including the control circuitry and the fluid-pressure actuating systems has been omitted from this specification, it being, of course, understood that these elements are conventional and operate in a manner as described in the above prior patents. A description of the actual operating procedures is similarly believed unnecessary as the operation thereof is immediately obvious to those skilled in the art and is identical to that operation described in the abovementioned patents. The actual difference resides particularly in the blade control, the gripper-clamp mechanisms and the interiorly positioned driving mechanisms; the operation of which has been described above.

Actual operation of the described mechanism to repeatedly skin hog sides has proven its complete dependability and practicality as far as being a versatile, automated machine.

Various additional advantages in addition to those specifically noted hereinabove may occur to those in the art upon studying the foregoing description. It is conceivable, also, that the apparatus may be modified somewhat in detail without departing from the basic concepts behind the novel structure disclosed.

The embodiments of the invention in which an exclusive property or privilege is claimed are defined as follows:

1. In a skinning machine having a supporting framework;
   a drum rotatably mounted in said framework, said drum having an elongated, axially extending ditch in its periphery;
   clamping means in said ditch;
   a skinning blade adjacent said drum extending parallel thereto to remove meat from the skin clamped in and moving with said drum;
   mounting means pivotally mounted on said frame supporting the ends of said blade for movement toward and away from said drum;
   the improvement comprising:
   control means operably connected to said mounting means, biasing said blade toward said drum and also operable to move said blade between a raised position and a cutting position;
   said control means comprising:
   first and second pressure-actuated cylinders connected between said blade mounting means and said framework;
   said first cylinder operable to move said blade between said raised and said cutting positions, said second cylinder operable to bias said first cylinder and said blade toward said drum, said first cylinder releasing said bias on said first cylinder in response to excessive pressure on said blade.

2. The improve skinning machine as described in claim 1 wherein each of said first and said second cylinders has a movable piston rod therein, said first cylinder piston rod connected to said mounting means to move said blade means between said raised and said cutting positions;

said second cylinder piston rod connected between said frame and said first cylinder;

said second cylinder piston rod normally being retracted by the application of fluid pressure in said cylinder to bias said first cylinder into normal blade-control position whereby the excessive force on said blade overcomes said bias provided by said second cylinder thereby allowing said blade to move away from said drum.

3. An apparatus as defined in claim 2 and further including regulating means for said fluid pressure source associated with said second cylinder;

said regulating means providing a release for said bias.

4. A skinning machine having a framework, a drum rotatably mounted in said framework;

means for rotating said drum;

and a skinning blade adjacent said drum to separate the meat from the skin of a side retained on said drum and rotated therewith, said blade means pivotally mounted in said framework for movement toward and away from said drum and control means for moving said blade, said control means comprising:

first fluid cylinder means having a piston rod therein connected to said mounting means, said piston rod movable within said cylinder upon the application of fluid pressure thereto to move said blade means toward and away from said drum; and second fluid cylinder means having a piston rod therein operably associated with said first cylinder and said mounting means to releasably bias said first cylinder, said blade, and said mounting means in a first position.

5. A skinning machine as described in claim 4 wherein said drum is mounted for rotation on axle means extending from the ends of said drum;

said means for rotating said drum including drive means located within said framework adjacent said drum; and means connecting said drive means to said drum for rotation thereby.

6. A skinning machine as described in claim 1 wherein said clamping means includes a first elongated jaw fixed in said ditch and a second elongated jaw in said ditch movable into and out of a gripping relation to said first jaw;

said second jaw having a sharpened edge surface facing said fixed jaw;

and powered actuating means connected to said second jaw to move said second jaw toward and away from said first jaw whereby said sharpened edge portion cuts through the meat on a hog side held between said jaws without damaging the skin on said hog side.

7. An apparatus as described in claim 4 and further including a raised projection on said fixed jaw extending along its length, said projection adapted to cooperate with said sharpened edge portion on said second jaw to securely hold a hog side placed between said jaws without damage.

8. In a skinning machine having a supporting framework;

a drum rotatably mounted in said framework, said drum having an elongated, axially extending ditch in its periphery;

clamping means in said ditch;

a skinning blade adjacent said drum extending parallel thereto to remove meat from the skin clamped in and moving with said drum;

mounting means pivotally mounted on said frame supporting the ends of said blade for movement toward and away from said drum; the improvement comprising:

pressure controlled means operably connected to said mounting means, biasing said blade toward said drum and also operable to move said blade between a raised position and a cutting position;

pressure regulating means for said pressure controlled means, said regulating means being releasably set at a predetermined pressure to relieve the bias on said blade upon the occurrence of excessive cutting forces on said blade.

* * * * *

PO-1050
(5/69)

UNITED STATES PATENT OFFICE
CERTIFICATE OF CORRECTION

Patent No. 3,744,407          Dated July 10, 1973

Inventor(s) Martin L. Harlan and Paul V. Kalavitz

It is certified that error appears in the above-identified patent and that said Letters Patent are hereby corrected as shown below:

Column 5, line 26:

"18" should be ---108---

Column 5, line 59:

"forward" should be ---toward---

Signed and sealed this 20th day of November 1973.

(SEAL)
Attest:

EDWARD M. FLETCHER, JR.          RENE D. TEGTMEYER
Attesting Officer                Acting Commissioner of Patents